(12) United States Patent
Klein

(10) Patent No.: US 7,739,675 B2
(45) Date of Patent: Jun. 15, 2010

(54) DYNAMICALLY COMPUTING A DEGRADATION ANALYSIS OF WAITING THREADS IN A VIRTUAL MACHINE

(75) Inventor: Paul Fredric Klein, Newbury Park, CA (US)

(73) Assignee: International Business Machines Corporation, Armonk, NY (US)

( * ) Notice: Subject to any disclaimer, the term of this patent is extended or adjusted under 35 U.S.C. 154(b) by 1200 days.

(21) Appl. No.: 11/303,192

(22) Filed: Dec. 16, 2005

(65) Prior Publication Data

US 2007/0168976 A1 Jul. 19, 2007

(51) Int. Cl.
G06F 9/45 (2006.01)
(52) U.S. Cl. .................................. 717/151; 717/154
(58) Field of Classification Search .......... 717/151–154
See application file for complete search history.

(56) References Cited

U.S. PATENT DOCUMENTS

| | | | | |
|---|---|---|---|---|
| 6,314,563 B1 * | 11/2001 | Agesen et al. | ............... | 717/108 |
| 6,513,155 B1 * | 1/2003 | Alexander et al. | ........... | 717/124 |
| 6,539,464 B1 | 3/2003 | Getov | ......................... | 711/170 |
| 6,606,742 B1 * | 8/2003 | Orton et al. | .................. | 717/140 |
| 6,651,243 B1 * | 11/2003 | Berry et al. | ................. | 717/130 |
| 6,751,789 B1 * | 6/2004 | Berry et al. | ................. | 717/130 |
| 6,862,674 B2 | 3/2005 | Dice et al. | .................. | 711/170 |
| 7,080,366 B2 * | 7/2006 | Kramskoy et al. | .......... | 717/148 |
| 7,191,441 B2 * | 3/2007 | Abbott et al. | .................. | 718/1 |
| 7,406,418 B2 * | 7/2008 | Chiu | .......................... | 704/270 |
| 7,509,632 B2 * | 3/2009 | Boger | ......................... | 717/133 |
| 7,584,465 B1 * | 9/2009 | Koh et al. | .................... | 717/162 |
| 2002/0108107 A1 * | 8/2002 | Darnell et al. | .............. | 717/153 |
| 2002/0112227 A1 * | 8/2002 | Kramskoy et al. | .......... | 717/148 |
| 2003/0167421 A1 | 9/2003 | Klemm | ......................... | 714/37 |
| 2006/0070028 A1 * | 3/2006 | Belov et al. | .................. | 717/114 |
| 2006/0161904 A1 * | 7/2006 | Farchi et al. | ................ | 717/135 |
| 2006/0225051 A1 * | 10/2006 | Kannan | ...................... | 717/129 |
| 2007/0061791 A1 * | 3/2007 | Hartikainen | ................. | 717/148 |
| 2007/0074170 A1 * | 3/2007 | Rossmann | .................. | 717/127 |

OTHER PUBLICATIONS

JVM™ Tool Interface, Version 1.0.38, [online] Last Updated Apr. 11, 2010 [retrieved on Oct. 6, 2005] Retrieved from the Internet: <URL: http://java.sun.com/j2se/1.5.0/docs/guide/jvmti/jvmti.html>. 200 pages.

User's Guide, Omegamon® XE for DB2, Version 100, [online] Sep. 2002 [retrieved on Oct. 27, 2005] Retrieved from the Internet: <URL: http://publib.boulder.ibm.com/tividd/td/ITOMEGAXEfDB2/GC-32-9297-00.pdf>. pp. 1-58.

* cited by examiner

Primary Examiner—Anna Deng
(74) Attorney, Agent, or Firm—Janet M. Skafar; Christine H. Smith; Matthew W. Baca

(57) ABSTRACT

Various embodiments of a computer-implemented method, system and computer program product determine degradation of an application program. At least one execution state of the application program, executing in a virtual machine, is sampled. A number of occurrences of the at least one execution state are counted to provide at least one count. The at least one execution state and at least one count, respectively, are stored.

17 Claims, 13 Drawing Sheets

12 ⟶ line number     Java instruction
   16             14

```
401    private boolean handleNewConnection()
402    {
403        String moduleName = "Control.handleNewConnection";
404
405        InputStream instream = null;
406        Boolean retCode = true;
407        int rLen
408        int aIdx;
409        byte aBuff[] = new byte[100];
410
411        if (tool.isShutDown())
412        return false;
413    try
414    {
415        instream = newSocket.getInStream();
416    }
417    catch(IOException ioe)
418    {
419        message.put(errorMessage1, ioe.getErrorMessage());
420        return false;
421    }
422    //Have the input stream
423    do
424    {
425        try
426        {
427            rLen = in.read(aBuff, 0, aBuff.length);
428        }
429        catch(IOException ioe)
430        {
431            message.put(errorMessage1, ioe.getErrorMessage());
432            retCode false;
433            break;
434        }
435    }
436    }
437    public int hello ()
438    {
439        String outString = "Hello World";
440        message.put(outmsg1, outString);
441        return 1;
442    }
```

FIG. 1          Prior art

DYNAMICALLY COMPUTING A DEGRADATION ANALYSIS OF WAITING THREADS IN A VIRTUAL MACHINE

BACKGROUND OF THE INVENTION

1. Field of the Invention

This invention relates to performance monitoring; and in particular, this invention relates to dynamically computing a degradation analysis of waiting threads in a virtual machine.

2. Description of the Related Art

A Java application program executes in a Java Virtual Machine on a computer system. A Java Virtual Machine (JVM) is a software machine which executes on the hardware of a physical machine, that is, a computer system. In other words, the JVM is a software simulation of a machine. The JVM takes as its program input a stream of bytes, referred to as bytecode, that represent execution code provided by a programming language, then simulates that program's execution one bytecode at a time. Programs that are written in a language that produces this bytecode are called Java application programs.

Multiple Java application programs can execute concurrently in the JVM. An operating system is software which executes on the computer system which manages the resources of the computer system. The Java application programs which are executing within the JVM typically compete with each other for operating system resources. As part of this competition, various ones of the Java application programs may wait in queues while needed resources are unavailable and do not continue executing until these resources are become available. While waiting, the Java application program does no productive work and its ability to complete the task-at-hand is degraded. A certain amount of waiting may be acceptable for Java application programs. However, when the amount of time spent waiting becomes excessive or if the number of times that waits occur exceeds a reasonable amount, the Java application program may not be programmed correctly to take advantage of the available resources. When this happens, the delay caused by the waiting Java application programs elongates the response time experienced by an end user. An enterprise may use Java application programs to perform various functions. Delays based on abnormal degradation consume employee time and may be costly to corporations.

FIG. 1 depicts a portion of an exemplary Java application program 12. The program logic of the Java application program comprises one or more Java instructions 14. Each line of a Java application program 12 is associated with a line number 16. One or more Java instructions may be on a line. The program logic of a Java application program 12 comprises one or more classes and each class comprises one or more Java methods. An exemplary Java method called handleNewConnection starts on line 401, and another exemplary Java method called hello starts on line 437. A Java instruction produces one or more bytecodes.

A Java thread is a unit of operation in a JVM. The JVM may divide the program logic of the Java application program into portions which can execute concurrently on separate threads. Therefore each Java application program may be executed using one or more threads. The threads are independent and execute concurrently. During execution, sometimes one portion of the Java application program executing on one thread needs to wait for execution to complete on another portion of the Java application program which is executing on another thread. There may be various reasons for a portion of a program to wait. Some reasons for waiting are not problematic, and other reasons may indicate a problem.

Therefore, there is a need to detect when a Java application program is waiting and to determine the reason(s) for causing the Java application program to wait.

SUMMARY OF THE INVENTION

To overcome the limitations in the prior art described above, and to overcome other limitations that will become apparent upon reading and understanding the present specification, various embodiments of a computer-implemented method, system and computer program product determine degradation of an application program. At least one execution state of the application program, executing in a virtual machine, is sampled. A number of occurrences of the at least one execution state are counted to provide at least one count. The at least one execution state and at least one count, respectively, are stored.

In this way, various embodiments of a technique are provided which detect and determine the reasons for what is causing an application program to wait. By identifying the reasons that are causing the largest percentages of wait time, a developer may make informed changes to the code of the application program to help reduce the amount of time spent waiting.

BRIEF DESCRIPTION OF THE DRAWINGS

The teachings of the present invention can be readily understood by considering the following description in conjunction with the accompanying drawings, in which:

FIG. 1 depicts a portion of an exemplary Java application program;

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to determine the reason(s) for degradation of the execution of an application program. Various embodiments of a computer-implemented method, system and computer program product determine degradation of an application program. At least one execution state of the application program, executing in a virtual machine, is sampled. A number of occurrences of the at least one execution state are counted to provide at least one count. The at least one execution state and at least one count, respectively, are stored.

In various embodiments, an agent is constructed within the context of the JVM to monitor and collect information on the performance of the Java application program. The agent samples a Java application program to identify the execution state of the Java application program and a number of times that the execution state occurred. The wait reasons which are degrading the Java application program can be identified from the execution states.

In some embodiments, the agent is constructed within the context of the Java 2 Software Development Kit (SDK) 1.5 facility known as the Java Virtual Machine Tool Interface (JVMTI), and uses the JVMTI interface functions. The JVMTI facility provides a number of programming interface functions that provide data about the Java Virtual Machine, Java application programs and the status of the Java application programs. The agent is stored in a library in a predetermined location accessible to the JVM and is registered with the JVMTI programming interface. In response to executing the Java application program, the JVM discovers, loads, and executes the agent.

In various embodiments, for the purpose of degradation analysis, the Java thread represents a level of work that performs the task-at-hand. Since Java application programs typically utilize threads to perform units of their program logic, performing degradation analysis based on the threads is equivalent to performing degradation analysis on various parts of the Java application program. The executing Java method name which the thread is executing is identified to help understand the reasons for degradation, as well as to identify what part of the Java application program in which the degradation is found. With this information, a developer may be able to determine where to modify the code to alleviate the problem.

Figure 2:
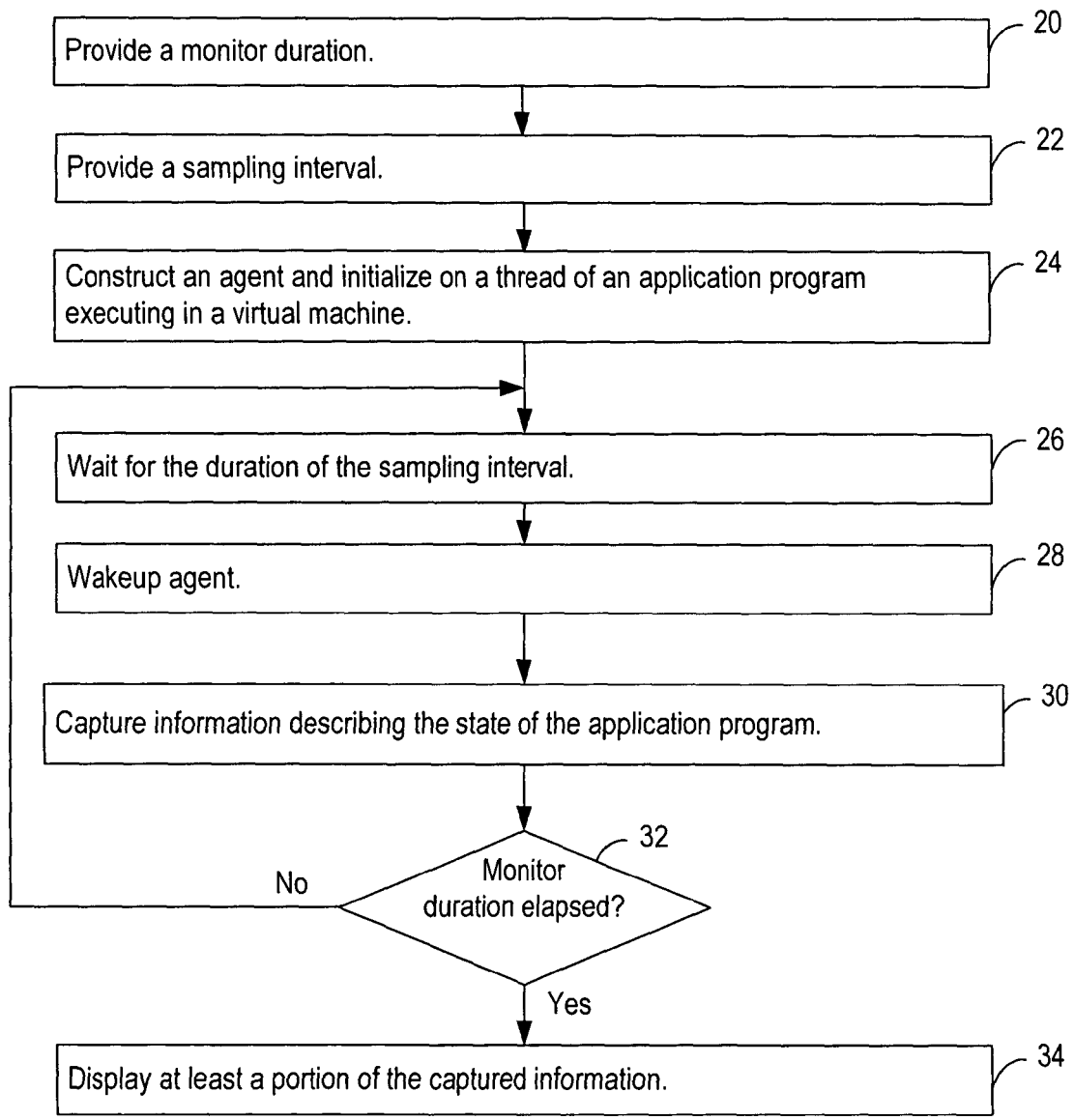
FIG. 2 depicts a high level flowchart of an embodiment of the operation of the performance monitor.

FIG. 2 depicts a high level flowchart of an embodiment of the operation of the performance monitor. In step 20, a monitor duration is provided. The monitor duration indicates how long the agent should collect samples. In some embodiments, a user provides the monitor duration. In other embodiments, step 20 is omitted and a predetermined monitor duration is used. Alternately, a number of samples to collect is provided rather than a monitor duration.

In step 22, a sampling interval is provided. The sampling interval specifies an amount of time to wait between taking samples of the state of the application program. In various embodiments, a user provides the sampling interval. In some embodiments, sampling intervals are typically between 100 milliseconds and 1 second. In other embodiments, other sampling intervals may be used. A smaller sampling interval increases the likelihood of detecting short-duration wait states. In various embodiments, having a small sampling interval and capturing short duration wait states may be important because a large number of short duration waits can significantly impact application program performance.

In step 24, an agent is constructed and initialized on a thread of an application program executing in a virtual machine. In various embodiments, the thread is a Java thread, the application program is a Java application program, and the virtual machine is a JVM. However, in other embodiments, other types of threads, application programs and virtual machines may be used. In various embodiments, the present invention is not meant to be limited to Java methods, and in various embodiments, is applied to other programming language methods, functions, subroutines and procedures. The term "program component" refers to a Java method, other programming language methods, functions, subroutines or procedures.

The agent initializes space to store an anchor array. In some embodiments, the anchor array is initialized to NULL. In various embodiments, the anchor array is stored in memory, such as semiconductor memory, one example of which is random access memory (RAM). In various embodiments, the performance monitor determines whether the JVM supports various JVMTI interface functions used to monitor performance prior to constructing the agent. In some embodiments, the performance monitor invokes the GetPotentialCapabilities function to determine the functions the JVM currently supports. If the performance monitor determines that the JVM does not support the functions used to monitor performance, the performance monitor notifies the user, and the performance monitor does not continue with execution. After initializing the agent on a thread, the agent enters a wait state.

In step 26, the agent waits for the duration of the sampling interval. In step 28, in response to the expiration of the sampling interval, the agent is awakened, that is, activated.

In step 30, the agent captures information describing the state of the application program. The application program may comprise one or more program components executing on one or more threads. In various embodiments, the execution state of the application program is captured based on a particular thread and associated particular program component being executed at the time the agent captures information. In some embodiments, an execution state of a method of a thread represents a distinct state.

In step 32, the agent determines whether the monitor duration is elapsed. If not, step 32 proceeds to step 26 to wait for another sampling interval to expire. If so, in step 34, at least a portion of the captured information is displayed.

Figure 3:
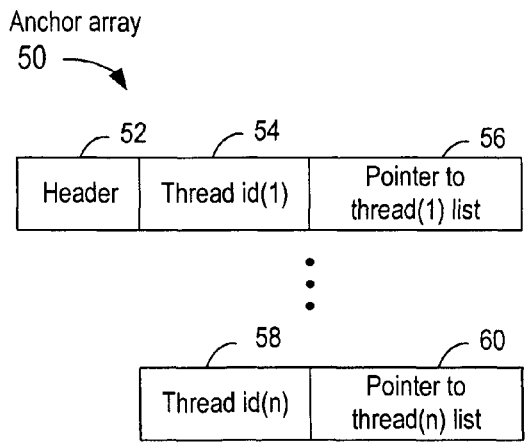
FIG. 3 depicts a diagram of an embodiment of the structure of an anchor array used by the performance monitor of FIG. 2.

FIG. 3 depicts a diagram of an embodiment of the structure of an anchor array 50 used by the agent of FIG. 2. The anchor array 50 contains information describing the state of the application program. Each thread is associated with a distinct thread identifier. The anchor array 50 comprises a header 52 and one or more thread identifier (id) and pointer pairs, 54 and 56, and 58 and 60, respectively. The pointers 56 and 60 point to thread lists. A thread list comprises data collected for the thread associated with the thread id. In this example, the anchor array 50 comprises n thread id's, where n=1, ..., n. Thread id(1) 54 is associated with a pointer to a thread(1) list, and thread id(n) 58 is associated with a pointer to a thread(n) list 60.

Figure 4:
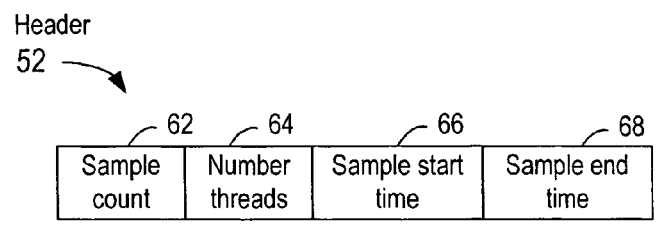
FIG. 4 depicts a diagram of an embodiment of the header of the anchor array of FIG. 3.

FIG. 4 depicts a diagram of an embodiment of the header 52 of the anchor array 50 (FIG. 3). The header 52 comprises a sample count 62, a number of threads 64 in the anchor array, a sample start time 66, and a sample end time 68.

Figure 5:
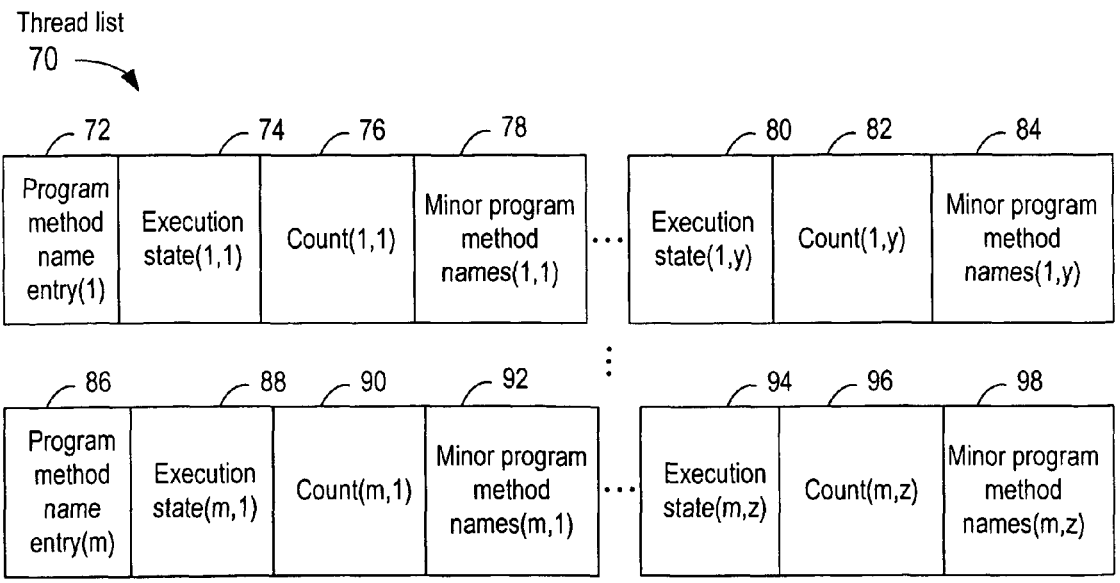
FIG. 5 depicts a diagram of an embodiment of the structure of a thread list referenced by the anchor array of FIG. 3.

FIG. 5 depicts a diagram of an embodiment of the structure of a thread list 70. The thread list 70 comprises m program method name entries, program method name entry (1) 72 to program method name entry (m) 86. The program method name entries are associated with a method of the top stack frame when the associated thread is sampled. Each program method name entry is associated at least one execution state, a count of the number of times that execution state is sampled, and a list of minor program method names associated with that execution state. As shown in FIG. 5, program method name entry(1) 72 is associated with y execution states. Program method name entry(1) is associated with execution state (1,1) 74, count(1,1) 76 and zero or more minor program method names(1,1) 78, to execution state(1,y) 80, count(1,y) 82 and zero or more minor program method names(1,1) 84. Program method name entry(m) is associated with execution state(m,1) 88, count(m,1) 90 and zero or more program minor program method names(m,1) 92, to execution state(m,z) 94, count(m,z) 96 and zero or more minor program method names(m,z) 98.

FIG. 6 comprises FIGS. 6A, 6B, 6C, 6C, 6E, 6F and 6G which collectively depict a flowchart of an embodiment of the operation of the agent. In various embodiments, at the end of the wait interval, the agent is activated and begins its analysis in accordance with the flowchart of FIG. 6.

Figure 6A:
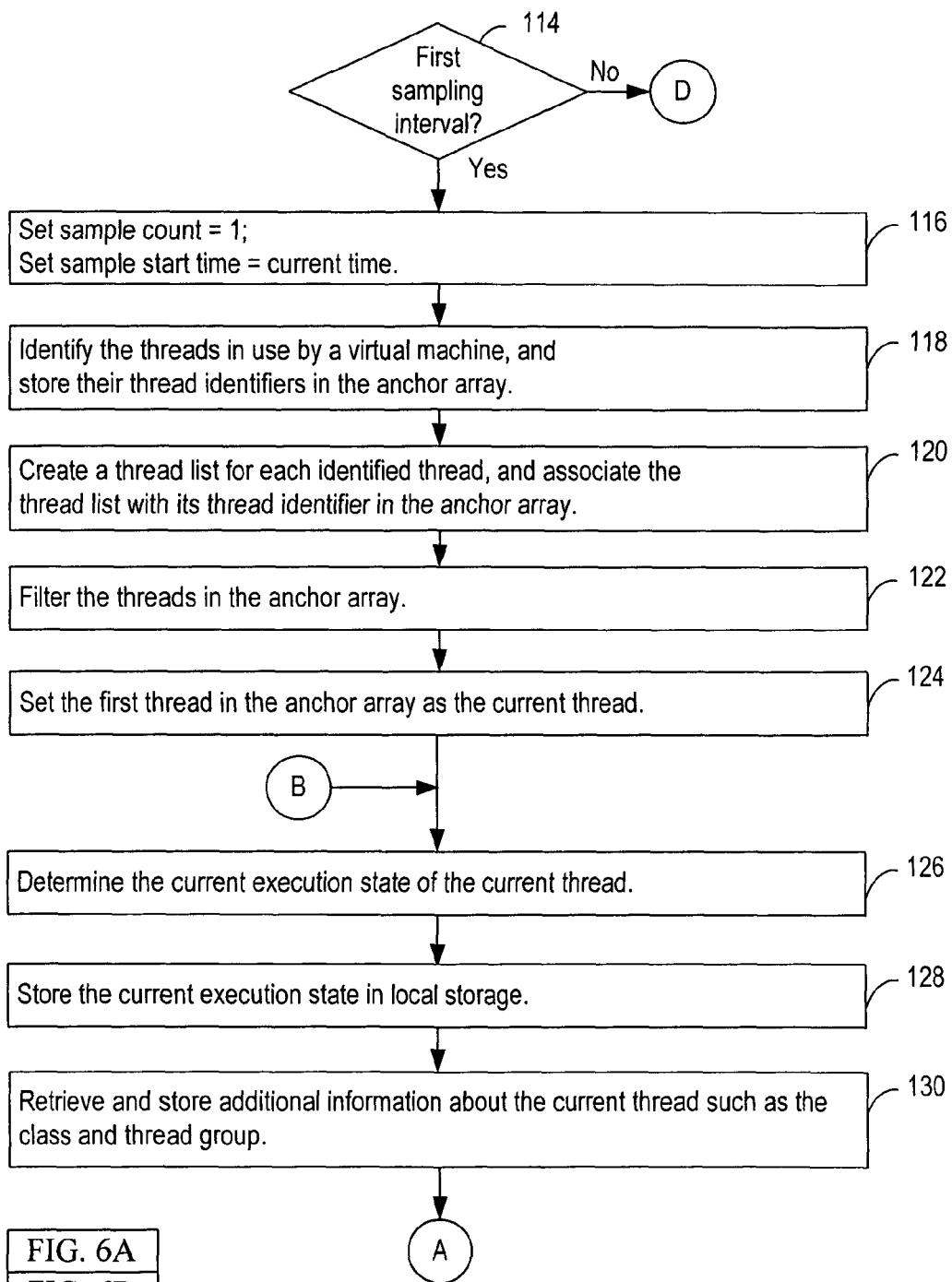
FIG. 6 comprises FIGS. 6A, 6B, 6C, 6D, 6E, 6F and 6G which collectively depict a flowchart of an embodiment of the operation of the agent of the performance monitor of FIG. 2.
Figure 6B:
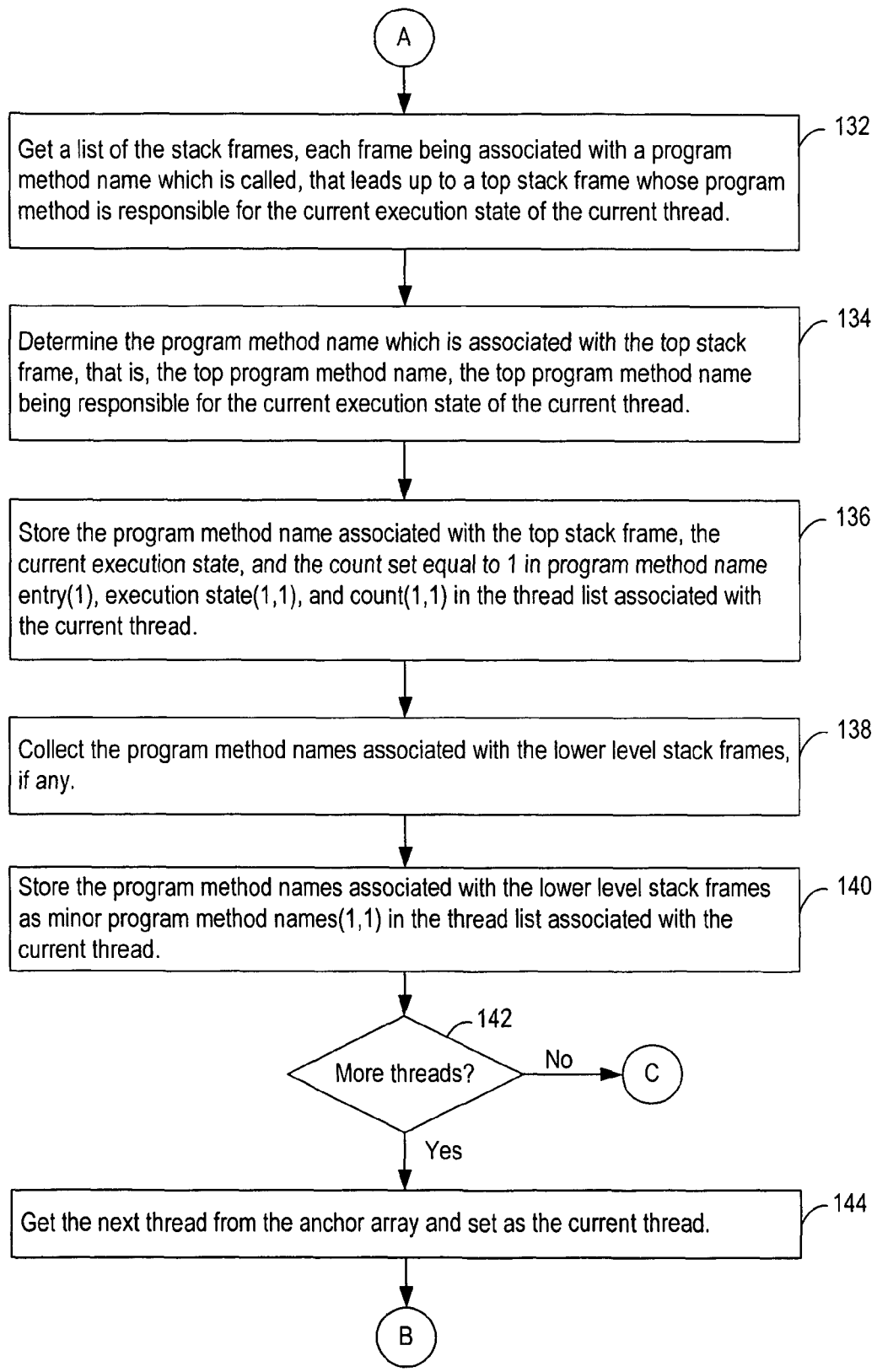

In FIG. 6A, in step 114, the agent determines whether the sampling interval is a first sampling interval. If so, step 114 proceeds to step 116.

In step 116, a sample count is set equal to one, and a sample start time is set equal to the current time.

In step 118, the agent identifies the threads in use by the virtual machine and stores their thread identifiers (ids) in the anchor array. Each thread has a distinct thread identifier. In various embodiments, the agent identifies all the threads used by a JVM. In some embodiments, the agent calls the JVMTI interface function GetAllThreads which returns an array of threads currently in use by the JVM, which also includes the threads in use by the Java application programs.

In step 120, a thread list is created for each identified thread, and the thread list is associated with its thread identifier in the anchor array. In various embodiments, the thread identifier and a reference to the thread list for that thread identifier are stored in the thread identifier and pointer of the anchor array, respectively. In various embodiments, the thread lists are in-memory lists, that is, the thread lists are stored in semiconductor random access memory.

In step 122, the threads of the anchor array are filtered. In some embodiments, the threads of the anchor array are presented to a user, and the user may remove one or more threads from the anchor array. In other embodiments, the GetThreadInfo function is used to identify a thread group which may be associated with a thread, and a user may specify which threads to monitor by selecting a thread group. The threads that are not part of the thread group are removed from the anchor array. In various embodiments, step 122 is omitted and the threads are not filtered.

In step 124, the agent sets the first thread in the anchor array as the current thread. In step 126, the agent determines the current execution state of the current thread. In some embodiments, the agent invokes the JVMTI GetThreadState interface function to determine the current execution state of the thread.

In various embodiments, the threads have a hierarchy of execution states. An exemplary hierarchy of execution states of Java threads is shown below:

(I) Thread is not-Alive
(II) Thread is Alive
    (A) Thread is Suspended
    (B) Thread is Interrupted
    (C) Thread is in Java Native Interface (JNI) Native Code
    (D) Status of AliveThread
        (1) Runnable
        (2) Blocked
        (3) Waiting
            (a) Indefinite
            (b) Timed
            (c) Object Wait -continued (d) Lock Support Wait
            (e) Sleeping However, the execution states are not meant to be limited to the above hierarchy of execution states, and in other embodiments, different hierarchies of execution states may be used.

In step 128, the current execution state of the thread is stored in local storage, at least temporarily. In various embodiments, the execution state of the thread will be one of the execution states from the exemplary hierarchy above. Local storage refers to an area that is not part of the anchor array and is temporary. In some embodiments, local storage is an area in volatile memory.

In step 130, the agent retrieves and stores additional information about the thread such as the class and thread group. In some embodiments, the agent invokes the JVMTI GetThreadInfo interface function which returns information about the Classloader and Thread Group responsible for this execution state. In some embodiments, step 130 is omitted. Step 130 proceeds via Continuator A to step 132 of FIG. 6B.

In step 132, the agent gets a list of the stack frames, each frame being associated with a program method name which is called, that leads up to a top stack frame whose program method is responsible for the current execution state of the current thread. A stack is a structure created during execution of a program which also contains state information. A stack is provided by Java and is part of the execution of a Java program. A stack frame is an entry in the stack and is associated with a program component, such as a Java method. A Java stack comprises a list of Java methods that have been invoked up to the current Java method which is being executed and is at the top of the stack. The stack provides information regarding the program flow. If the top Java method is waiting, then all the other Java methods in the stack lead up to the wait of the top Java method, and are waiting for the top Java method to complete execution. In response to a return instruction, a Java method ends and the stack frame for that Java method is removed from the stack. For example, Java method one is invoked and a stack frame is added to the top of the stack for Java method one. Within Java method one, a Java instruction invokes Java method two. A stack frame is added to the top of the stack for Java method two. The stack frame for Java method one is no longer at the top of the stack. Within Java method two, another Java instruction invokes Java method three. A stack frame is added to the top of the stack for Java method three. At this point, the stack frame for Java method three is at the top of the stack.

In some embodiments, the agent invokes the JVMTI GetStackTrace interface function for the current thread. The results of the JVMTI GetStackTrace interface function comprise a list of all the stack frames, each frame being associated with a Java method call that leads up to a top stack frame whose Java method is associated with the current execution state of the current thread.

In step 134, the agent determines the program method name which is associated with the top stack frame, that is, the top program method name, the top program method name being responsible for the current execution state of the current thread.

In step 136, the agent stores the program method name associated with the top stack frame, the current execution state, and the count set equal to one in program method name entry(1), execution state(1,1), and count(1,1) in the thread list associated with the current thread.

In step 138, the program method names associated with the lower level stack frames, if any, are collected. These program method names, also referred to as minor program method names, are the program methods names leading up to the program method name of interest, that is, the program method name of the top stack frame. In various embodiments, the minor program method names are concatenated together to form a string.

In step 140, the agent stores the program method names associated with the lower level stack frames as minor program method names(1,1) in the thread list associated with the current thread. In some embodiments, the entry has an indicator to indicate the minor program method names. In various embodiments, the minor program method names are used to determine an amount of time that a program method is waiting for another program method to complete. In this way, a derived execution state, called waiting-on-another-method-to-complete, can also be provided. At this point the current thread is analyzed.

Step 142 determines whether there are any more threads to analyze. The agent determines whether all the threads in the anchor array are analyzed. In response to step 142 determining that there are more threads to analyze in the anchor array, in step 144, the agent gets the next thread from the anchor array and sets that thread as the current thread. Step 144 proceeds via Continuator B to step 126 of FIG. 6A to analyze the new current thread.

Figure 6C:
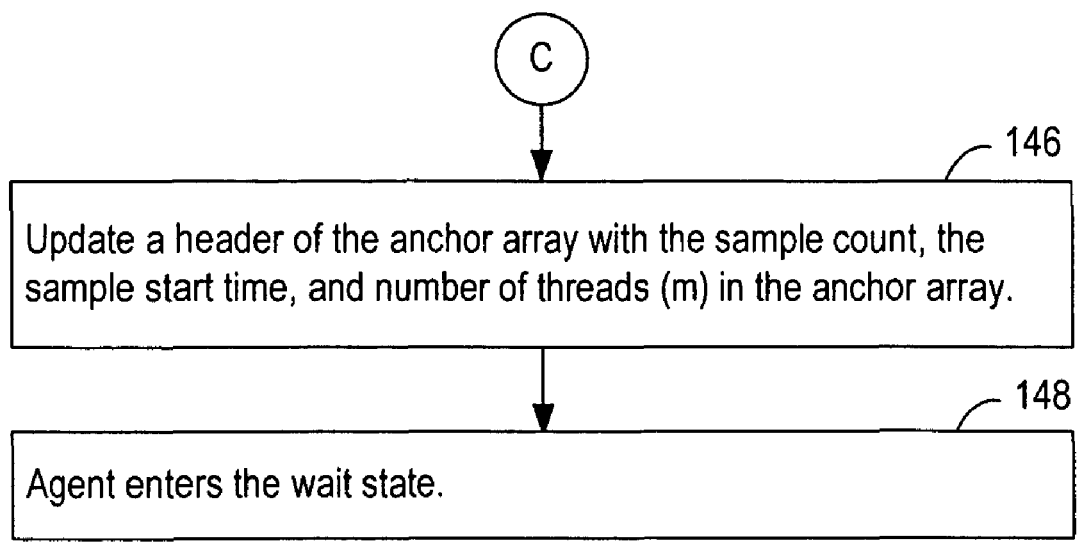

In response to the agent determining, in step 142, that there are no more threads in the anchor array to analyze, step 142 proceeds via Continuator C to step 146 of FIG. 6C.

In FIG. 6C in step 146, the header of the anchor array is updated with the sample count, the sample start time, number of threads (m) in the anchor array, and the current time as the sample end time. In this way, the duration of the sampling can be monitored by subtracting the sample start time from the sample end time. In step 148, the agent enters the wait state to wait for an amount of time equal to the sampling interval.

After analyzing all the threads in the anchor array in the first sampling interval, the anchor array comprises one or more thread identifiers which are associated with one or more thread list pointers, respectively. Each thread list pointer references one thread list for each thread, and each thread list contains a program method name with that program method's execution state, and a count of one.

In response to an amount of time equal to the sampling interval elapsing, the agent wakes up and continues the analysis as follows.

Figure 6D:
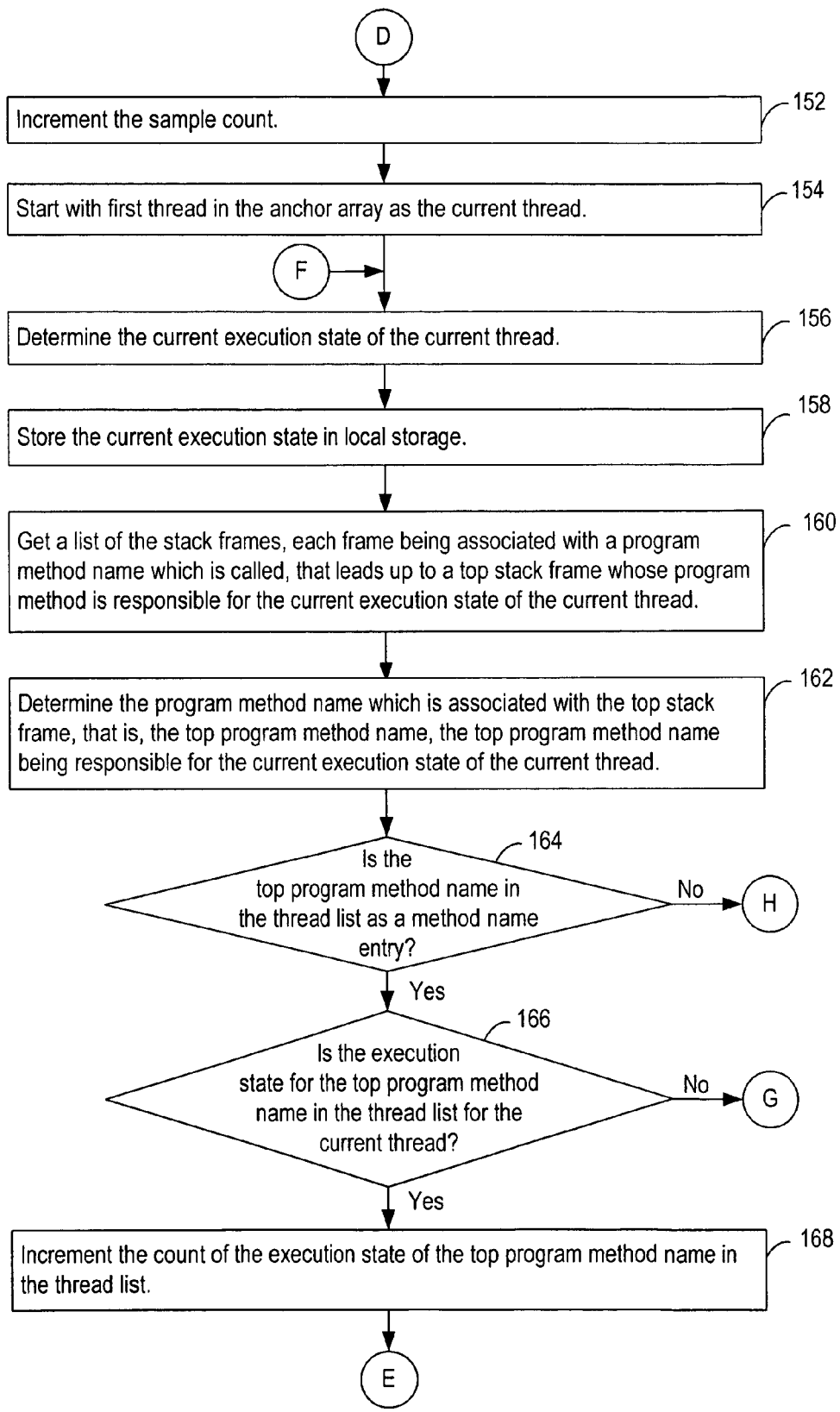

In response to step 112 of FIG. 6A determining that the sampling interval is not the first interval, step 112 proceeds via Continuator D to step 152 of FIG. 6D. In various embodiments, the agent determines that the interval is not the first interval if an anchor array with at least one thread identifier exists.

In step 152, the agent increments the sample count. In step 154, the agent starts with the first thread in the anchor array as the current thread. In step 156, the agent determines the current execution state of the current thread. In step 158, the agent stores the current execution state in local storage.

In step 160, the agent gets a list of the stack frames, each frame being associated with a program method name which is called, that leads up to a top stack frame whose program method is responsible for the current execution state of the current thread.

In step 162, the agent determines the program method name which is associated with the top stack frame, that is, the top program method name, the top program method name being responsible for the current execution state of the current thread.

In step 164, the agent determines whether the top program method name is in the thread list associated with the current thread as a program method name entry. The agent searches the thread list associated with top program method name. In response to finding a program method name in the thread list, that program method name is already an entry in the thread list associated with the thread.

In response to the agent determining, in step 164, that the top program method name is in the thread list associated with the current thread, in step 166, the agent determines whether the execution state for the top program method name is in the thread list for the current thread. In response to the agent determining, in step 166, that the execution state for the top program method name is in the thread list for the current thread, in step 168, the agent increments the count of the execution state of the top program method name in the thread list. In this way, a running total of the number of times that the execution state is observed for a program method associated with a thread is maintained. Step 168 proceeds via Continuator E to step 170 of FIG. 6E.

Figure 6E:
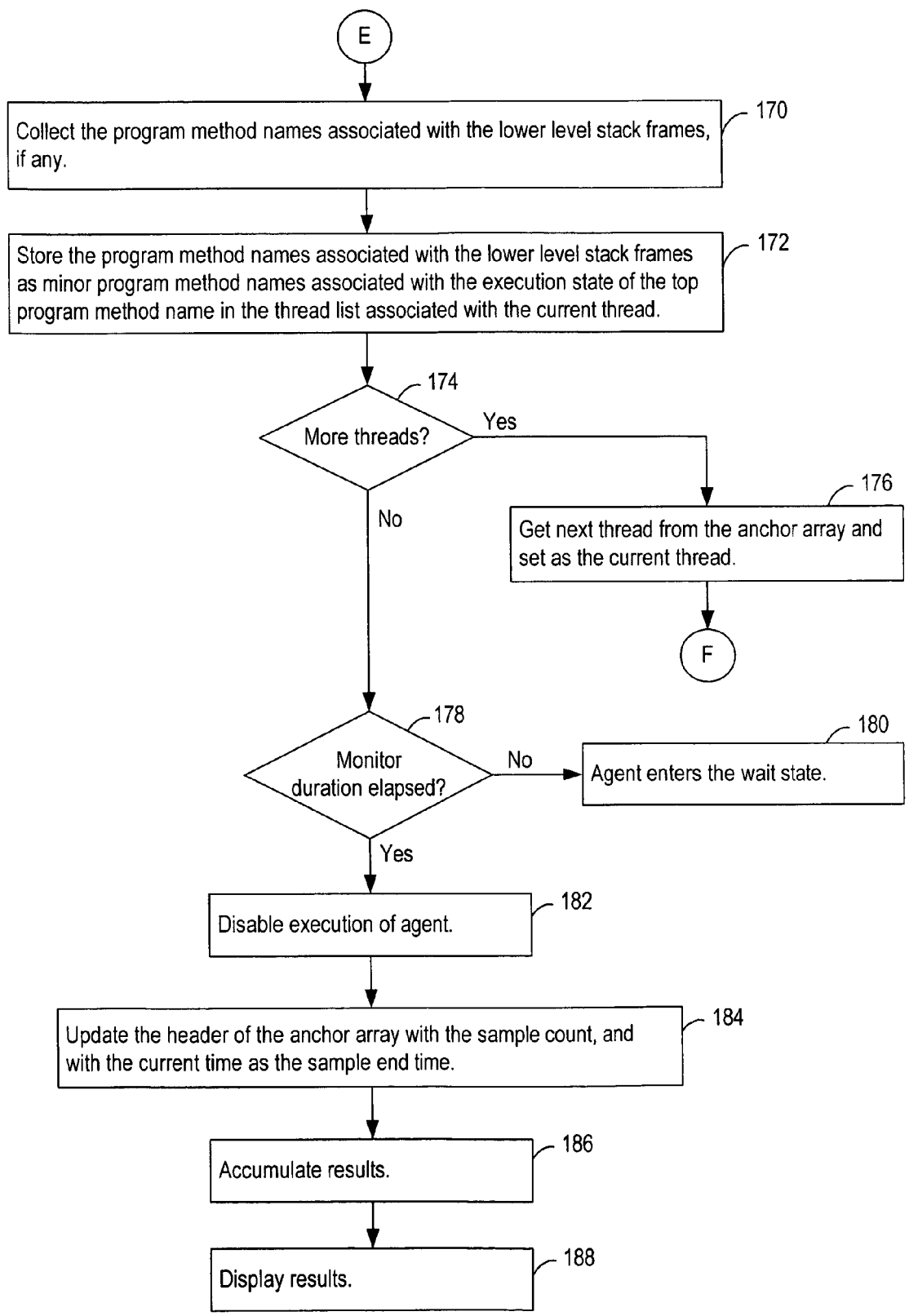

In FIG. 6E in step 170, the agent collects the program method names associated with the lower level stack frames, if any. In step 172, the agent stores the program method names associated with the lower level stack frames as minor program method names associated with the execution state of the top program method name in the thread list associated with the current thread.

In step 174 of FIG. 6E, the agent determines whether there are any more threads to analyze in the anchor array. In response to step 174 determining that there are more threads to analyze in the anchor array, in step 176, the agent gets the next thread from the anchor array and sets that thread as the current thread. Step 176 proceeds via Continuator F to step 156 of FIG. 6D to analyze the new current thread.

In response to step 174 determining that there are no more threads to analyze, in step 178, the agent determines whether the monitor duration is elapsed. The agent determines that the monitor duration is elapsed in response to the difference between the current time and the sample start time being greater than or equal to the monitor duration. In response to determining that the monitor duration is not elapsed, in step 180, the agent enters the wait state.

In response to the agent determining, in step 178, that the monitor duration is elapsed, in step 182, the execution of the agent is disabled. In step 184, the agent updates the header of the anchor array with the sample count, and with the current time as the sample end time. The total duration of the sampling can be determined by subtracting the sample start time from the sample end time.

In step 186, the results in the anchor array are accumulated. In step 186, the results are displayed.

Figure 6F:
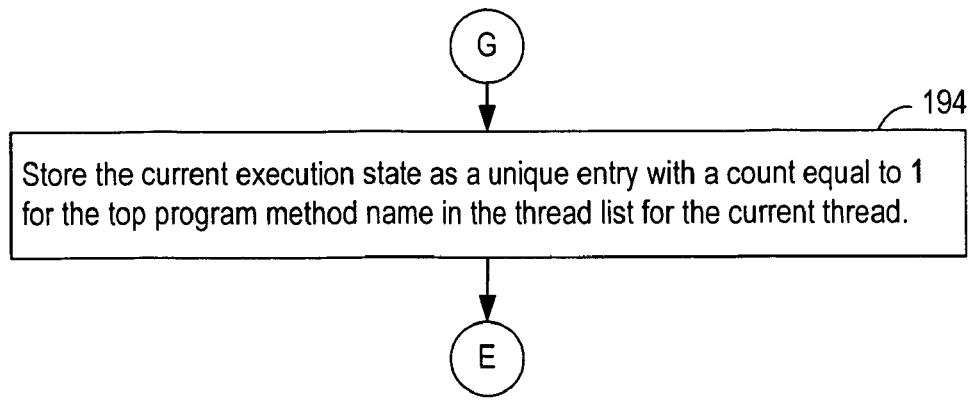

In response to step 166 of FIG. 6D determining that the execution state for the top program method name is not in the thread list for the current thread, step 166 proceeds via Continuator G to step 194 of FIG. 6F. In step 194, the agent stores the current execution state as a unique entry with a count equal to one for the top program method name in the thread list for the current program method. Step 194 proceeds via Continuator E to step 170 of FIG. 6D.

Figure 6G:
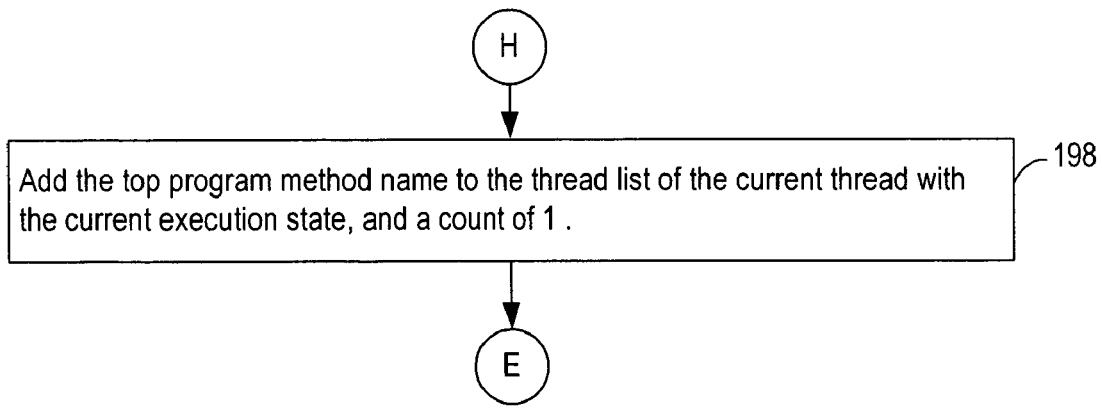

In response to step 164 of FIG. 6D determining that the top program method name is not in the thread list for the current thread, step 164 proceeds via Continuator H to step 198 of FIG. 6G. In step 198, the agent adds the top program method name to the thread list of the current thread with the current execution state, and a count of one as another unique entry to the thread list. Step 198 proceeds via Continuator E to step 170 to FIG. 6D.

When the sampling is complete, the in-memory thread lists contain a degradation analysis of the program methods which are executed during the total sampling interval duration. The anchor array and the in-memory thread lists are supplied to a user interface to display the results.

In other embodiments, in FIGS. 5 and 6, a program component name is used rather than a program method name.

In some embodiments, when performing a degradation analysis, the results in the thread lists of the anchor array are aggregated in various ways. In various embodiments, non-execution states are considered to be wait states; therefore, execution states such as blocked, suspended and interrupted will be considered to be wait states. For example, if a state is blocked and lock wait then lock wait will be used as the execution state. In some embodiments, if the execution state of a thread is not-alive then that thread will be ignored in the subsequent analysis. In various embodiments, threads in Java native interface code will be given the wait reason of unknown and will assume to be waiting.

In various embodiments, the minor program method names are used to determine a percentage of time that the waiting method is waiting for other methods to complete executing. The minor program method names are searched and the number of times that the program method name is found as a minor program method name is used to determine a percentage of times that the program method is waiting for other program methods to complete executing. In various embodiments, when a Java method is waiting for another top-of-frame Java method to complete, another wait state, referred to as "Stack Wait", is shown.

Figure 7:
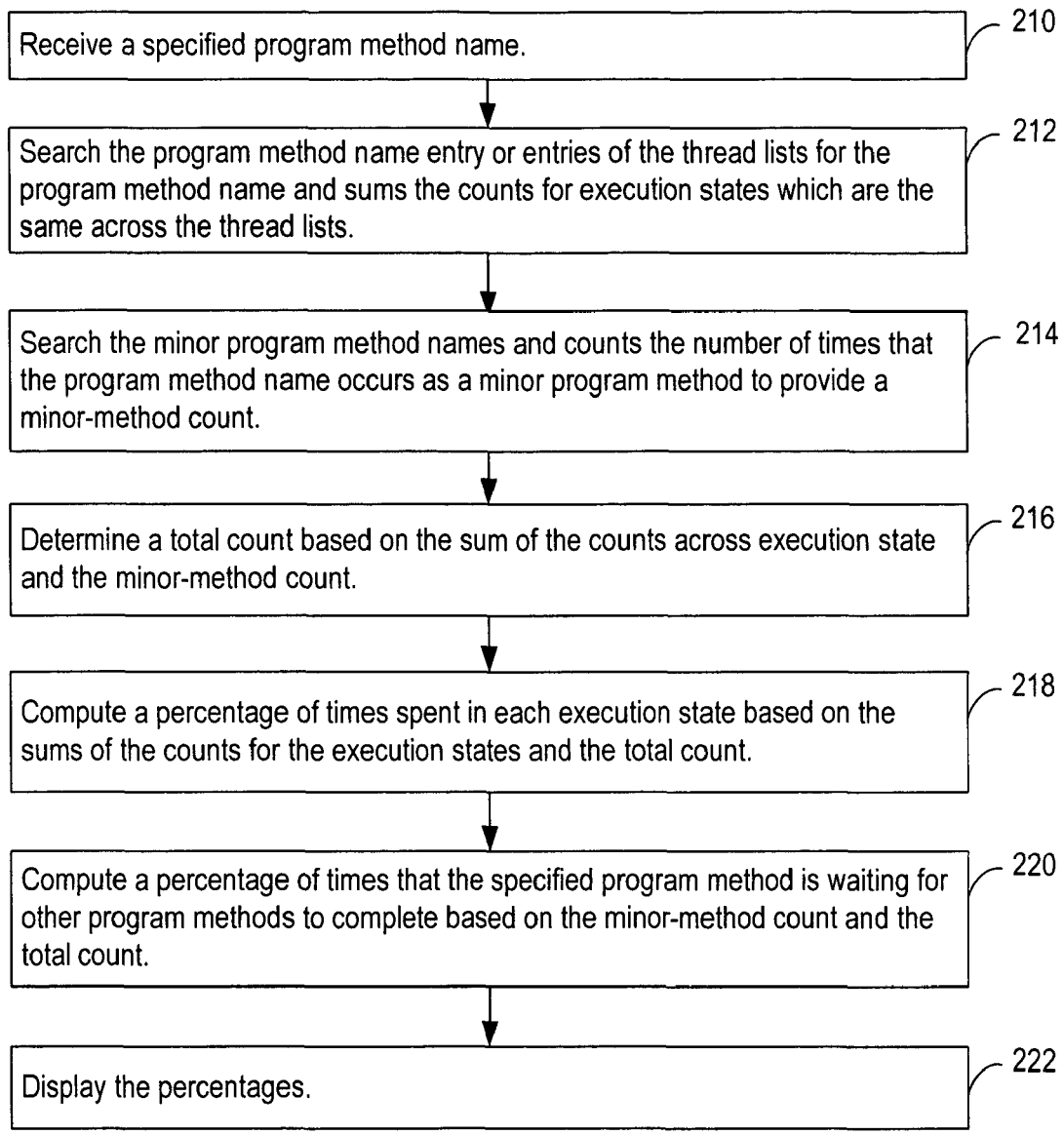
FIG. 7 depicts a flowchart of an embodiment of aggregating the data in the anchor array and thread lists.

FIG. 7 depicts a flowchart of an embodiment of aggregating the data in the anchor array and thread lists. In some embodiments, a display module implements the flowchart of FIG. 7. In step 210, a program method name is specified. In step 212, the display module searches the program method name entry or entries of the thread lists for the program method name and sums the counts for execution states which are the same across the thread lists. In step 214, the display module searches the minor program method names and counts the number of times that the program method name occurs as a minor program method to provide a minor-method-count. In step 216, the display module determines a total count based on the sum of the counts across execution state and the minor-method count.

In step 218, the display module computes a percentage of times spent in each execution state based on the sums of the counts for the execution states and the total count. In step 220, the display module computes a percentage of times that the specified program method is waiting for other program methods to complete based on the minor-method count and the total count. In step 222, the display module displays the percentages.

Monitoring the execution of an application program using sampling can increase the overhead to an application program. However, in various embodiments, sampling is performed for a short period of time, for example, less than five minutes, and in various embodiments, a user can specify a monitor duration, that is, the amount of time to monitor the application program. Alternately, a user may specify a number of samples rather than a monitor duration. The agent will be invoked for the number of times based on the user-specified number of samples. In various embodiments, a small number of samples, for example, less than 1,000, is typically sufficient to provide a useful analysis.

Figure 8:
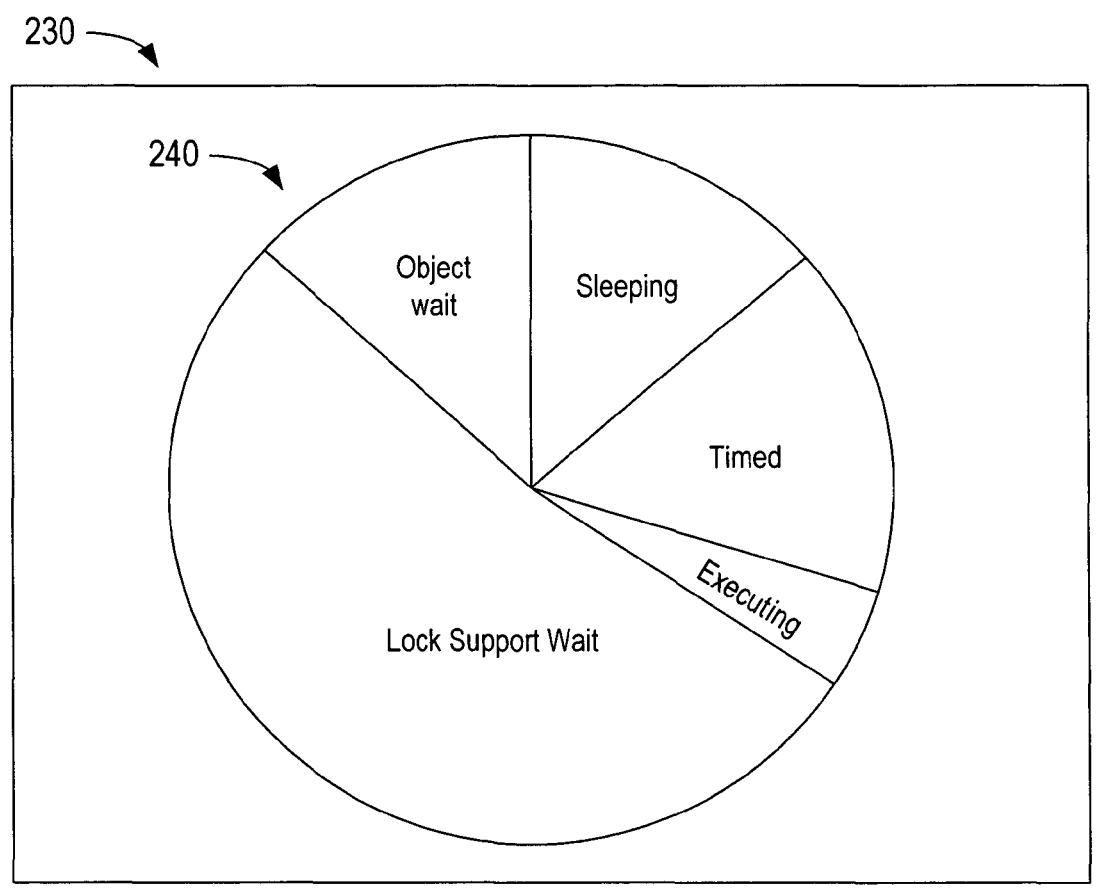
FIG. 8 depicts a diagram of an embodiment of displaying the aggregated results produced by the flowchart of FIG. 7.

FIG. 8 depicts a diagram of an embodiment of displaying the aggregated results produced by the flowchart of FIG. 6 in a window 230 of a graphical user interface. The window 230 has a pie-chart 240. This pie-chart presents a degradation analysis of 332 samples with a sample interval of 1.5 seconds. The threads are waiting 82% of the time and executing 11% of the time for a monitor duration of 14.3 minutes. This type of pie-chart 240 is a roll-up of all the thread lists in the anchor array. The pie-chart 240 is a JVM-wide view of degradation analysis which is indicating that the lock wait execution state is the major factor as to why the JVM is running poorly. The next level down, a drill-down, would show each Java method that is executing and the degradation analysis for each method.

In other embodiments, a degradation analysis is presented in a list as follows:

program method name execution state count percentage

In some embodiments, degradation analysis is performed by line number. When sampling is performed, execution state information is updated by program method and line number.

Figure 9:
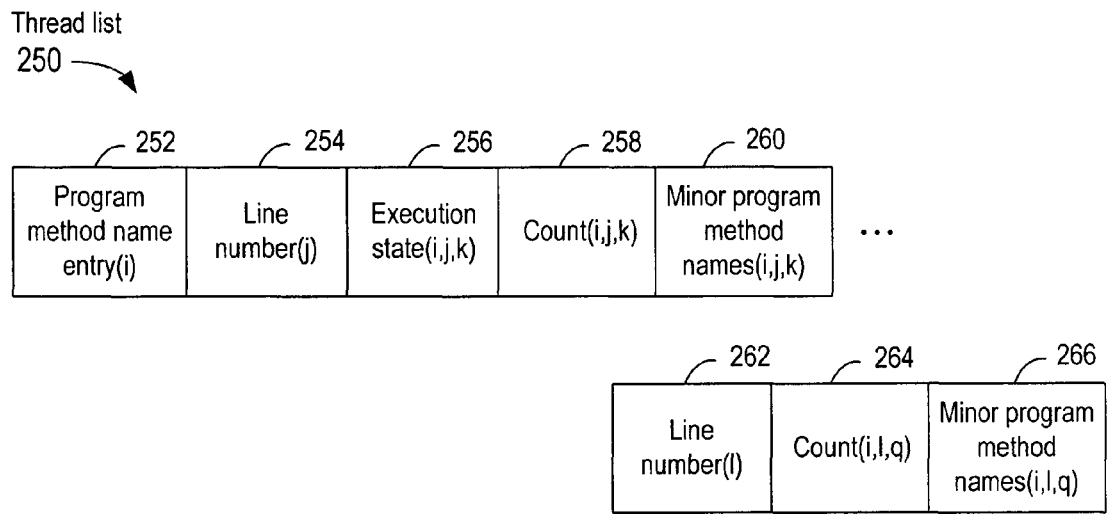
FIG. 9 depicts a diagram of another embodiment of a thread list.

FIG. 9 depicts a block diagram of another embodiment of the structure of a thread list 250. The thread list of FIG. 9 stores execution state information by line number. The thread list 250 comprises program method name entry(i) 252, line numbers) 254, execution state(i,j,l) 256, count(i,j,k) 258 and zero or more minor program method names(i,j,k) 260, to line number(l) 262, count(i,l,q) 264 and zero or more minor program method names(i,l,q) 266.

Figure 10:
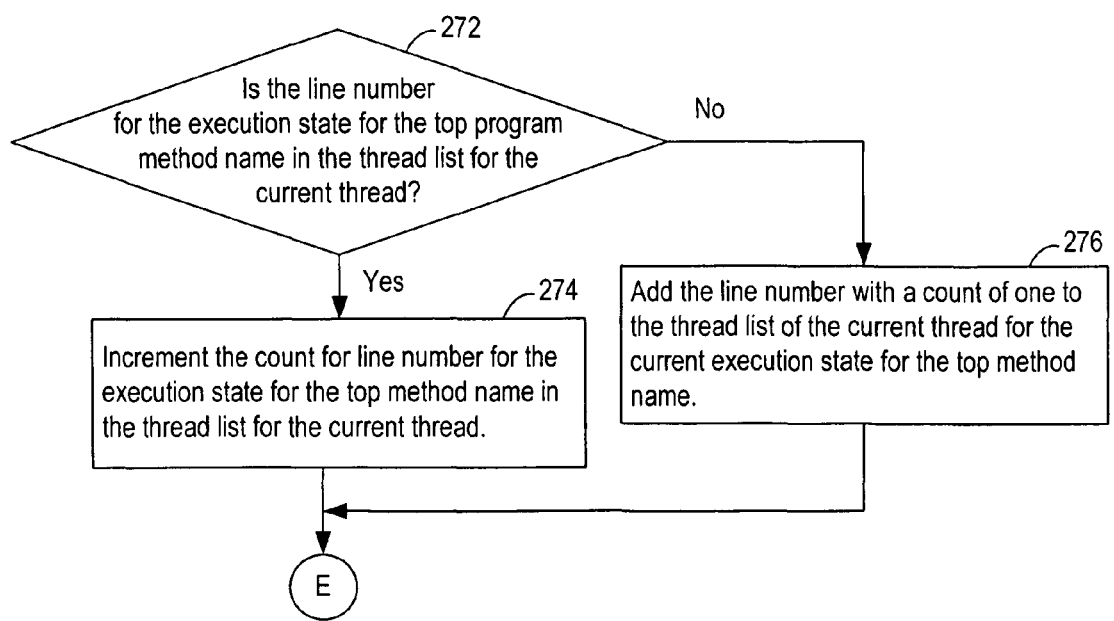
FIG. 10 depicts a flowchart of an embodiment of additional changes to the flowchart of FIG. 6E to store data by line number.

In various embodiments, the flowchart of FIG. 6 is modified to collect data by line number. In FIG. 6B, step 134 determines the line number in addition to the program method name, and step 136 also stores the line number. In FIG. 6D, step 162 determines the line number in addition to the program method name. FIG. 10 depicts a flowchart of an embodiment of additional changes to the flowchart of FIG. 6E to store data by line number. Step 168 of FIG. 6D is replaced with the flowchart of FIG. 10. In FIG. 10, step 272 determines whether the line number for the execution state for the top program method name is in the thread list for the current thread. If so, in step 274, the agent increments the count for that line number for the execution state for the top program method name in the thread list for the current thread. If not, in step 276, the agent adds the line number with a count of one to the thread list of the current thread for the current execution state for the top program method name. In FIG. 6F, step 194 also stores the line number in the thread list. In FIG. 6G, step 198 also adds the line number to the thread list. FIG. 7 is modified to accumulate the counts for the line numbers of a program method to determine the percentage distribution by program method. In various embodiments, the percentage of time in the execution states is determined and displayed for the lines numbers of a program method.

In yet another embodiment, the flowchart of FIG. 6 is modified to collect data by bytecode. In some embodiments, the flowchart of FIG. 6 is modified to collect data by both line number and bytecode.

In another embodiment, the minor program method names are not stored. The minor program method names are omitted from the thread lists of FIGS. 5 and 9. Steps 138 and 140 of FIG. 6B, step 170 and 172 of FIG. 6E are omitted. In FIG. 7, steps 214 and 220 are omitted, and step 216 omits the minor-method count.

Figure 11:
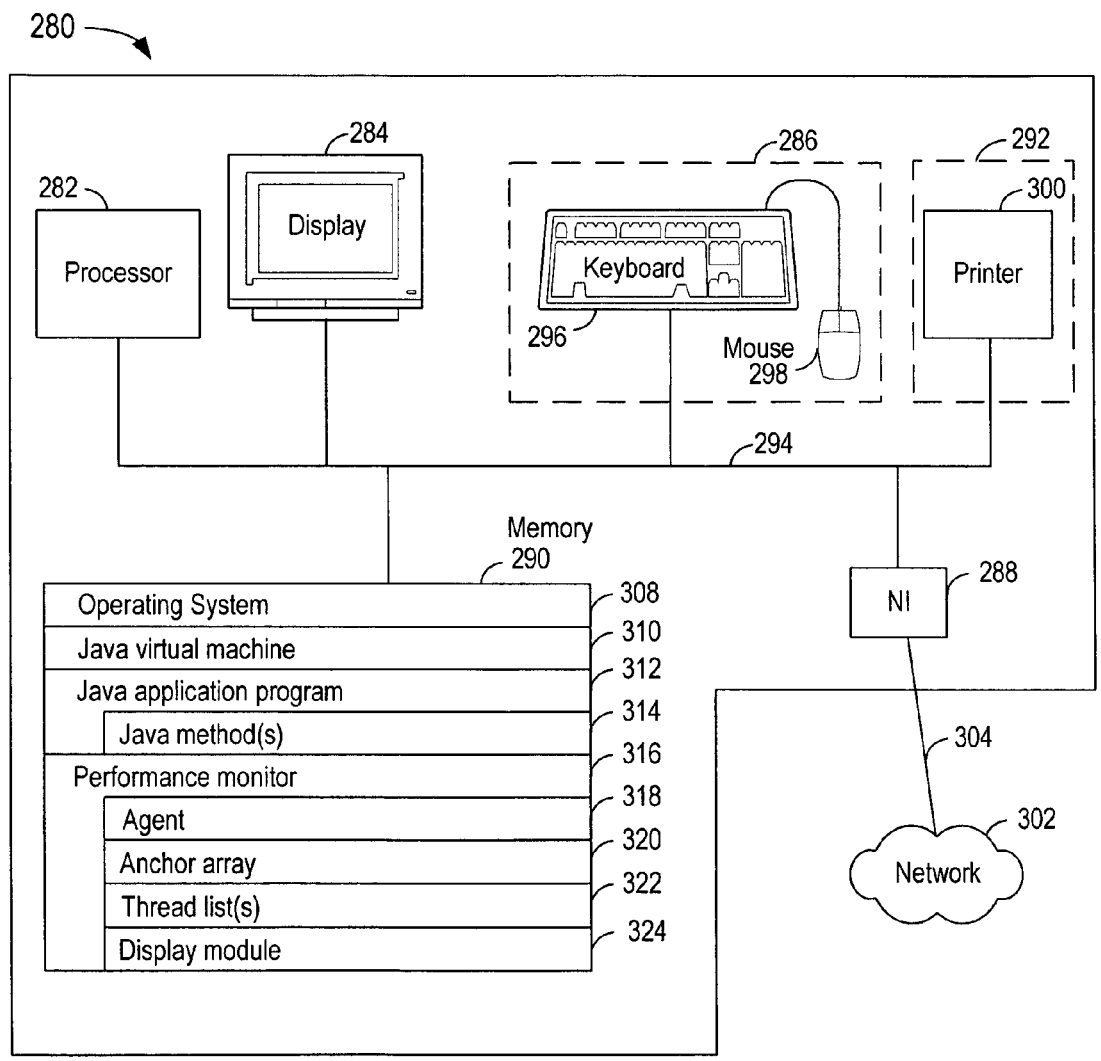
FIG. 11 depicts an illustrative computer system which uses various embodiments of the present invention.

FIG. 11 depicts an illustrative computer system 280 which uses various embodiments of the present invention. The computer system 280 comprises a processor 282, display 284, input interfaces (I/F) 286, communications interface 288, memory 290 and output interface(s) 292, all conventionally coupled, directly or indirectly, by one or more buses 294. The input interfaces 286 comprise at least one of a keyboard 296, and a pointing device such as a mouse 298. The output interface 292 comprises a printer 300. The communications interface 288 is a network interface (NI) that allows the computer 280 to communicate via a network 302, such as the Internet. The communications interface 288 may be coupled to a transmission medium 304 such as a network transmission line, for example twisted pair, coaxial cable or fiber optic cable. In another embodiment, the communications interface 288 provides a wireless interface, that is, the communications interface 288 uses a wireless transmission medium.

The memory 290 generally comprises different modalities, illustratively volatile memory such as semiconductor memory, such as random access memory (RAM), and persistent or non-volatile memory, such as, disk drives. In some embodiments, the memory comprises local memory which is employed during execution of the program code, bulk storage, and one or more cache memories which provide temporary storage of at least some program code in order to reduce the number of times code is retrieved from bulk storage during execution. In various embodiments, the memory 290 stores an operating system 308, a virtual machine such as the Java virtual machine 310, an application program such as the Java application program 312 comprising one or more program components such as Java methods 314, and a performance monitor 316. The performance monitor 316 comprises an agent 318, anchor array 320, one or more thread lists 322 and a display module 324.

In various embodiments, the specific software instructions, data structures and data that implement various embodiments of the present invention are typically incorporated in the performance monitor 316. Generally, an embodiment of the present invention is tangibly embodied in a computer-readable medium, for example, the memory 290 and is comprised of instructions which, when executed by the processor 282, causes the computer system 280 to utilize the present invention. The memory 290 may store the software instructions, data structures and data for any of the operating system 308, the Java virtual machine 310, the Java application program 312, and the performance monitor 316, in semiconductor memory, in disk memory, or a combination thereof.

The operating system 308 may be implemented by any conventional operating system such as the z/OS, MVS, OS/390, AIX, UNIX, WINDOWS, LINUX, Solaris and HP-UX operating systems.

In various embodiments, the present invention may be implemented as a method, apparatus, computer program product or article of manufacture using standard programming and/or engineering techniques to produce software, firmware, hardware, or any combination thereof. Various embodiments of the invention are implemented in software, which includes and is not limited to firmware, resident software, and microcode.

Furthermore, various embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium comprise a semiconductor or solid state memory, magnetic tape, a removable computer diskette, a random access memory (RAM), a read-only memory (ROM), a rigid magnetic disk and an optical disk. Current examples of optical disks comprise compact disk—read only memory (CD-ROM), compact disk—read/write (CD-R/W) and digital video disk (DVD). In addition, the software in which various embodiments are implemented may be accessible through, for example, from a server over the network. Those skilled in the art will recognize that many modifications may be made to this configuration without departing from the scope of the present invention.

The exemplary computer system illustrated in FIG. 11 is not intended to limit the present invention. Other alternative hardware environments may be used without departing from the scope of the present invention.

Although various embodiments have been described with reference to a Java virtual machine and a Java application program with Java methods, the invention is not meant to be limited to the Java virtual machine and the Java application program with Java methods. In other embodiments, the present invention is applied to other virtual machines and application programs. In various embodiments, the present invention is not limited to Java methods, and is applied to program components comprising Java methods, other programming language methods, functions, subroutines and procedures.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

TRADEMARKS

IBM, z/OS, MVS, OS/390 and AIX are registered trademarks of International Business Machines Corporation. Java and all Java-based trademarks are trademarks of Sun Microsystems, Inc. in the United States, other countries, or both. Solaris® is a registered trademark of Sun Microsystems, Inc. Microsoft and Windows are trademarks of Microsoft Corporation in the United States, other countries or both. UNIX is a registered trademark of The Open Group in the United States and other countries. HP-UX® is a registered trademark of Hewlett-Packard Development Company, L.P. LINUX® is a registered trademark of Linus Torvalds.

What is claimed is:

1. A computer-implemented method of determining degradation of an application program, comprising:
   executing said application program in a virtual machine;
   sampling at least one execution state of said application program, said at least one execution state being at least one wait state, respectively; said at least one wait state comprising a plurality of distinct types of wait states, wherein said at least one execution state comprises a plurality of execution states;
   counting a number of occurrences of said at least one execution state to provide at least one count, wherein each distinct type of wait state has a count of said at least one count;
   storing said at least one execution state and said at least one count, respectively;
   aggregating said at least one count associated with at least a portion of said plurality of execution states of at least one thread identifier to provide aggregating results;

displaying said aggregating results;

determining at least one percentage that said application program is in at least one distinct type of wait state of said plurality of distinct types of wait states based on said at least one count; and displaying at least one indication representing said at least one percentage.

2. The method of claim 1 wherein said at least one execution state is associated with a thread identifier, a program component name and a line number;

wherein said counting counts said number of occurrences of said at least one execution state of said line number of said at least one program component name of said at least one thread identifier; and wherein said storing stores said at least one execution state, said at least one line number, said at least one program component name, said at least one thread identifier and said at least one count.

3. A computer program product for determining degradation of an application program, the computer program product comprising a computer readable storage medium having computer readable program code embodied therewith, the computer readable program code comprising:

computer readable program code configured to sample at least one execution state of an application program executing in a virtual machine, said at least one execution state being at least one wait state, respectively; said at least one wait state comprising a plurality of distinct types of wait states, wherein said at least one execution state comprises a plurality of execution states;

computer readable program code configured to count a number of occurrences of said at least one execution state to provide at least one count value, wherein each distinct type of wait state has a count value of said at least one count value;

computer readable program code configured to store said at least one execution state and said at least one count value, respectively;

computer readable program code configured to aggregate said at least one count value associated with at least a portion of said plurality of execution states of at least one thread identifier to provide aggregating results;

computer readable program code configured to display said aggregating results;

computer readable program code configured to determine at least one percentage that said application program is in at least one distinct type of wait state of said plurality of distinct types of wait states based on said at least one count value; and computer readable program code configured to display at least one indication representing said at least one percentage.

4. The computer program product of claim 3 wherein said at least one execution state is associated with at least one thread having at least one thread identifier, wherein said number of occurrences of said at least one execution state of said at least one thread identifier is counted to provide said at least one count value; and wherein said at least one execution state and said at least one count value associated with said at least one thread identifier are stored.

5. The computer program product of claim 3 wherein said at least one execution state is associated with a thread identifier and a program component name;

wherein said number of occurrences of said at least one execution state of said at least one program component name of said at least one thread identifier is counted to provide said at least one count value; and wherein said at least one execution state, said at least one program component name, said at least one thread identifier and said at least one count value are stored.

6. The computer program product of claim 3 wherein said at least one execution state is associated with a thread identifier and a program component name;

wherein said number of occurrences of said at least one execution state of said at least one program component name of said at least one thread identifier is counted to provide said at least one count value; and wherein said at least one execution state, said at least one program component name, said at least one thread identifier and said at least one count value are stored.

7. The computer program product of claim 3 wherein said at least one execution state is associated with a thread identifier, a program component name and a line number;

wherein said number of occurrences of said at least one execution state of said line number of said at least one program component name of said at least one thread identifier is counted to provide said at least one count value; and wherein said at least one execution state, said at least one line number, said at least one program component name, said at least one thread identifier and said at least one count value are stored.

8. The computer program product of claim 3 wherein the computer readable program code comprises:

computer readable program code configured to display said at least one execution state and said at least one count value of one or more program components.

9. The computer program product of claim 3 wherein said virtual machine is a Java virtual machine and said application program is a Java application program.

10. A computer system, comprising:

a processor; and a memory storing instructions, executable by said processor, to:

execute an application program in a virtual machine;

sample at least one execution state of said application program, said at least one execution state being at least one wait state, respectively; said at least one wait state comprising a plurality of distinct types of wait states, wherein said at least one execution state comprises a plurality of execution states;

count a number of occurrences of said at least one wait state to provide at least one count, wherein each distinct type of wait state has a count of said at least one count;

store said at least one execution state and said at least one count, respectively;

determine aggregating results based on said at least one count associated with at least a portion of said plurality of execution states of at least one thread identifier;

display said aggregating results;

determine at least one percentage that said application program is in at least one distinct type of wait state of said plurality of distinct types of wait states based on said at least one count; and display at least one indication representing said at least one percentage.

11. The computer system of claim 10, said memory storing:

an agent associated with said virtual machine, wherein said agent samples said at least one execution state and provides said at least one count.

12. The computer system of claim 10 wherein said at least one execution state is associated with at least one thread having at least one thread identifier, and
wherein said number of occurrences of said at least one execution state of said at least one thread identifier is said at least one count.

13. The computer system of claim 10 wherein said at least one execution state is associated with a thread identifier and a program component name; and
wherein said number of occurrences of said at least one execution state of said at least one program component name of said at least one thread identifier provides said at least one count.

14. The computer system of claim 10 wherein said at least one execution state is associated with a thread identifier, a program component name and a line number; and
wherein said number of occurrences of said at least one execution state of said line number of said at least one program component name of said at least one thread identifier provides said at least one count.

15. The computer system of claim 10 wherein said at least one execution state and said at least one count of one or more program components is displayed.

16. The method of claim 1 wherein said at least one wait state comprises at least one state from a group consisting of a timed wait state, an object wait state and a sleeping wait state.

17. The method of claim 1
wherein said determining said at least one percentage determines a plurality of percentages that said application program is in said each distinct type of wait state of said plurality of distinct types of wait states based on said at least one count; and
wherein said displaying said at least one indication displays a plurality of indications representing said plurality of percentages.

* * * * *